(12) United States Patent
Kyrtsos

(10) Patent No.: US 6,275,753 B1
(45) Date of Patent: Aug. 14, 2001

(54) METHOD AND SYSTEM FOR DETECTING AND ADJUSTING WHEEL MISALIGNMENT OF A VEHICLE

(75) Inventor: Christos Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/504,534

(22) Filed: Feb. 15, 2000

(51) Int. Cl.[7] .................................................. B60Q 1/00
(52) U.S. Cl. ........................... 701/36; 701/31; 701/38
(58) Field of Search ...................... 701/36, 31, 38; 340/679, 686.2, 686.3, 438, 439, 440; 73/457

(56) References Cited

U.S. PATENT DOCUMENTS

| | | | |
|---|---|---|---|
| 5,218,556 | 6/1993 | Dale, Jr. ............................. | 700/279 |
| 5,513,439 * | 5/1996 | Brauer et al. ...................... | 33/203.18 |
| 5,795,997 * | 8/1998 | Gittins et al. ....................... | 73/118.1 |
| 5,943,783 * | 8/2000 | Jackson ................................. | 33/288 |
| 6,061,895 * | 5/2000 | Shinjo et al. ....................... | 29/602.1 |
| 6,098,296 * | 8/2000 | Perisho, Jr. et al. ................ | 33/203 |
| 6,208,240 * | 3/2001 | Ledesma .............................. | 340/438 |

* cited by examiner

Primary Examiner—William A. Cuchlinski, Jr.
Assistant Examiner—Marthe Marc-Coleman
(74) Attorney, Agent, or Firm—Carlson, Gaskey & Olds

(57) ABSTRACT

A method and system for detecting and adjusting misalignment of wheels of a vehicle while the vehicle is traveling on a road includes a sensor for sensing the number of revolutions for each of the steering wheels. A controller determines an alignment function based on the number of revolutions and compares the alignment function to an alignment threshold. The controller then detects misalignment of the steering wheels it the alignment function differs from the alignment threshold. Once misalignment is detected, an adjustment member is used to actively adjust the toe-in/toe-out position of the wheels as the vehicle travels down the road.

23 Claims, 2 Drawing Sheets

METHOD AND SYSTEM FOR DETECTING AND ADJUSTING WHEEL MISALIGNMENT OF A VEHICLE

TECHNICAL FIELD

The present invention relates to methods and systems for detecting and adjusting vehicle wheel misalignment due to toe-in and toe-out.

BACKGROUND OF THE INVENTION

Vehicle wheels sometimes experience misalignment. Impacts from the road along with general wear and tear can cause "wheel misalignment" where a tire touches the road at an undesirable angle. This, in turn, affects the control of the vehicle and rapidly wears the tire. Typically, when wheel misalignment occurs, the vehicle in motion steers towards one side, forcing the driver to counter-steer the vehicle in the opposite direction in order to compensate for the misalignment. In such a situation, the vehicle should be "realigned" to have the proper tire orientation restored.

For efficient operation, vehicles require routine adjustments to wheel alignments. Various factors are relevant to wheel alignment including: turning radius, axle caster, wheel camber, king pin inclination, and wheel toe-in/toe-out. Each of these factors, explained below, must be taken into account to achieve minimum tire wear, maximum component life, and ease of steering.

The turning radius is the radius ol the arc created by the center of the vehicle track for the outside front wheel when making the shortest turn. Caster angle is the inclination in degrees that the top of the king pin leans towards the front or rear of the vehicle with respect to the vertical. Typically positive caster is used, which places the axis of the king pin ahead of the point of road contact. This causes the wheels to want to roll straight ahead, thus achieving maximum directional stability. Wheel camber is the amount in degrees that the front wheels incline or tilt away from the vertical plane when all of the wheels are resting on a level plane and in the straight ahead position. Camber places the road contact point closer to the axis of the king pin to reduce axle stresses. King pin inclination angle is the amount in degrees that the top of the king pin is inclined from a vertical position towards the chassis centerline at the top and away from the centerline at the bottom. Wheel misalignment occurs if any of these factors are out of specification, however, most misalignments generally involve toe in/out of the steering axle.

When viewing the front axle and wheels from the top, if the front of the wheels are closer to each other than the back of the wheels, this is called toe-in. If the front of the wheels are farther away from each other than the backs of the wheels, it is called toe-out. Typically, because of camber, the wheels are adjusted for toe in so that when the vehicle is in motion the wheels will remain parallel with the vehicle. If the toe-in is not in the correct adjustment position, vehicle steering is affected and tire wear is increased.

Presently, to determine whether, and how much wheel alignment adjustment is necessary, a worker either manually estimates or electronically determines the toe-in/out measurement while the vehicle is stationary. Then, the worker manually adjusts the steering components to correct the misalignment in order to establish the correct toe-in position for the tires.

Although this present method of determining the wheel misalignment of a vehicle has been used for years, this method is somewhat time consuming and sometimes inaccurate. In large part this is due to a misread of the toe-in measurement prior to adjustment, or an improper configuration of an alignment measurement device.

SUMMARY OF THE INVENTION

Thus, it is an object of the present invention to provide a method and system for detecting misalignment of a vehicle's steering wheels while the vehicle is actually travelling on a road.

It is yet another object of the present invention to provide a method and system for automatically controlling the steering wheels to bring them into alignment upon detecting the misalignment.

In carrying out the above objects and other objects, features and advantages of the present invention, a method is provided for detecting misalignment of wheels of a vehicle while the vehicle is traveling on a road. The method includes monitoring the number of revolutions for each of the steering wheels, determining an alignment function based on the number of revolutions, comparing the alignment function to a predetermined threshold, and detecting misalignment of the steering wheels if the alignment function differs from the predetermined threshold by a predetermined amount.

In further carrying out the above objects and other objects, features and advantages of the present invention, a system is provided for carrying out the steps of the above method. The system includes a sensor for sensing the number of revolutions for each of the steering wheels. The system also includes a controller for determining an alignment function based on the number of revolutions, comparing the alignment function to a predetermined threshold, and detecting misalignment of the steering wheels if the alignment function differs from the predetermined threshold by a predetermined amount.

Another feature of the subject invention is a system that actively adjusts wheel misalignment during vehicle travel. The system includes a controller for generating a control signal when wheel misalignment is detected and an adjustment bar extending between and operatively coupled to the wheels to move the wheels between any of various toe-in and toe-out positions. An actuator is connected to the adjustment bar to control the position of the bar based on the control signal.

These and other objects, features and advantages of the present invention can be understood from the following specification and drawings.

BRIEF DESCRIPTION OF THE DRAWINGS

FIG. 2A is a schematic diagram illustrating an axle with toe-in;

DETAILED DESCRIPTION OF A PREFERRED EMBODIMENT

Figure 1:
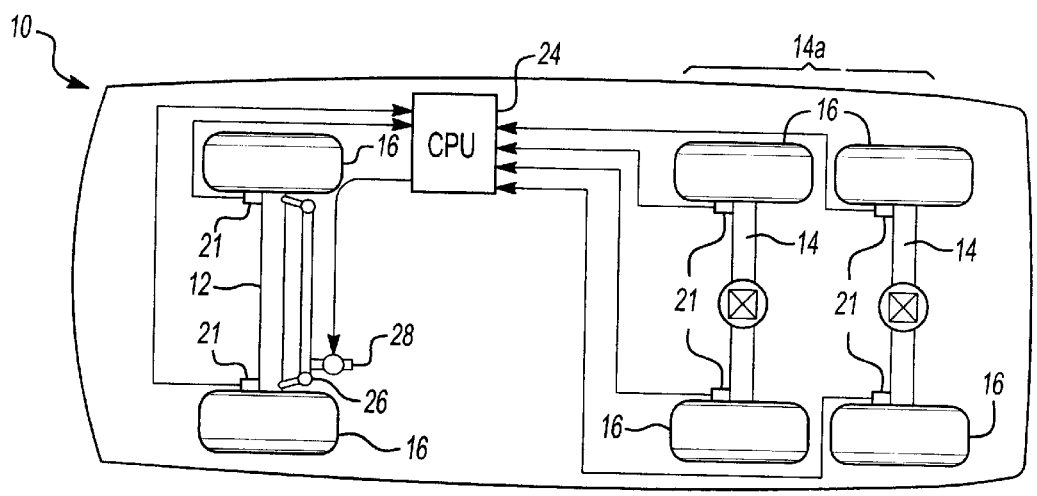
FIG. 1 is a schematic view of a vehicle incorporating the system of the present invention.

A vehicle is shown generally at 10 in FIG. 1. The vehicle typically includes a front non-drive steering axle 12 and a rear axle 14 having wheels 16 attached thereto. Alternatively, the rear axle 14 may be a tandem axle as illustrated at 14a. The vehicle 10 includes conventional wheel speed sensors 21 mounted at each wheel 16 for measuring the wheel speed, or generating a series of pulses corresponding to wheel speed as is well known in the art. The wheel speed sensors 21 generate wheel speed signals that are transmitted to a central processing unit (CPU) 24 having control logic programmed therein to perform the method of the present invention, as will be described in greater detail below.

Furthermore, the vehicle 10 includes a conventional tie-rod or adjustment bar 26 coupled between the two front steering wheels 16. The adjustment bar 26 is typically adjusted manually to correct for any toe-in/toe-out misalignment between the left and right front steering wheels 16. In the present invention, the vehicle 10 includes a motor 28, such as a linear motor, coupled to the adjustment bar 26 and the CPU 24. Upon receiving the wheel speed signals from the wheel speed sensors 21, CPU 24 processes the data according to the control logic programmed therein to determine if the toe-in alignment for the wheels 16 is out of specification. If so, CPU 24 generates an appropriate control signal for receipt by the motor 28, which then operates to move the adjustment bar 26 accordingly to properly align the front steering wheels 16, i.e. adjust the wheels for increased or decreased toe-in.

Figure 2:
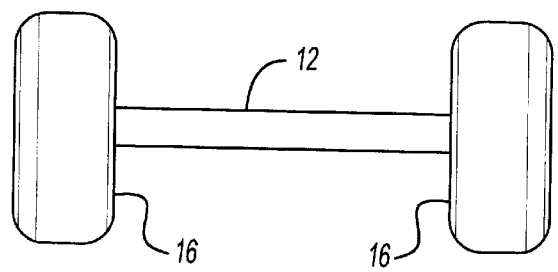
FIG. 2 is a schematic diagram illustrating an axle with ideal wheel position.
Figure 2A:
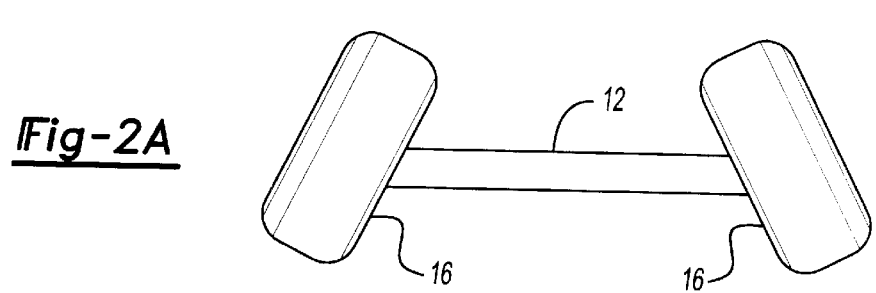
Figure 2B:
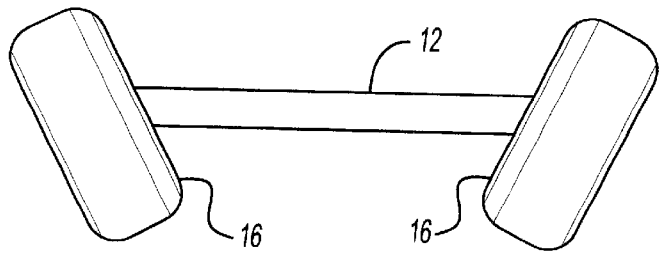
FIG. 2B is a schematic diagram illustrating an axle with toe-out.

An ideal wheel alignment for the axle 12 is shown in FIG. 2. An exaggerated toe-in alignment is shown in FIG. 2A. Note that, as viewed from the top, the front of the wheels 16 are closer together than the rear of the wheels. An exaggerated toe-out alignment is shown in FIG. 2B. Note that, as viewed from the top, the front of the wheels 16 are further away from each other than the rear of the wheels 16. If there is too much toe-in or toe-out, the wheels are misaligned and the tires will have increased wear. Also, steering will be affected because the driver will attempt to hold the vehicle centered by turning the wheels 16 back to the try to achieve the ideal wheel alignment shown in FIG. 2.

Figure 3:
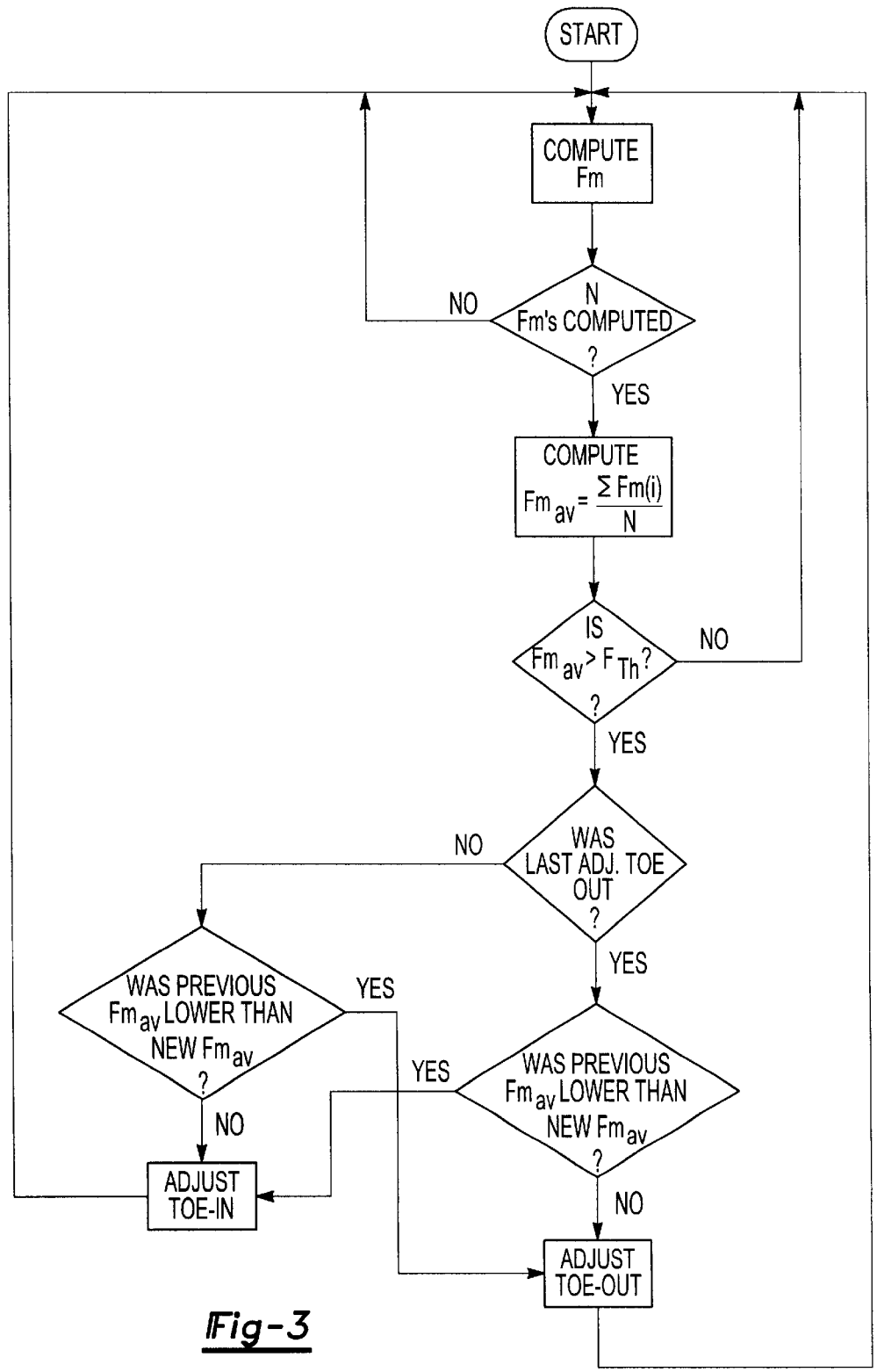
FIG. 3 is a flow diagram illustrating the general sequence of steps associated with the method of the present invention.

Turning now to FIG. 3, there is shown a flow diagram illustrating the general sequence of steps associated with the method of the present invention. The method begins with the step of determining an alignment function Fm, shown at block 40. In order to determine Fm, the number of revolutions for each of the steeling wheels 16 must be measured. This is accomplished by counting the number of pulses sensed by the wheel speed sensors 21. That is, a predetermined number of pulses may correspond to one wheel revolution, or, in contrast, there may be one pulse generated and sensed per wheel revolution. A predetermined number N of alignment functions are calculated such that an average $Fm_{av}$ can be determined. The predetermined set N can be based on a certain number of alignment factors per distance traveled or can be based on a certain number of alignment factors per a specific length of time. $Fm_{av}$ is calculated based on the following formula: $Fm_{av} = \Sigma Fm(i)/N$. The alignment functions Fm will be computed until the predetermined number N has been calculated, as shown at block 42. Once the predetermined number N of alignment functions Fm have been calculated, the average $Fm_{av}$ is calculated, as shown at block 44.

Next, the average alignment function $Fm_{av}$ is compared to a predetermined alignment threshold Fth, as shown at block 46. If the average alignment function $Fm_{av}$ is greater than the predetermined threshold Fth by a predetermined amount then a misalignment is detected. The threshold Fth can be a predetermined value, can be experimentally determined, or can be a previous $Fm_{av}$ value. The determination of Fth is discussed in greater detail below.

The alignment function Fm can be determined in one of several ways. For example, in a first embodiment, the alignment function Fm corresponds to the number of wheel revolutions counted over a known predetermined distance. This known distance can be computed, for example, via a Global Positioning System (GPS). In this case, the predetermined threshold Fth corresponds to a number of wheel revolutions derived experimentally during the predetermined distance when the wheels 16 are perfectly aligned. If the number of wheel revolutions exceed or are less then the predetermined number of wheel revolutions by a predetermined amount, then a misalignment in the steering wheels 16 can be identified.

In an alternative embodiment, the alignment function Fm corresponds to the number of wheel revolutions computed over a predetermined amount of time. In this case, the predetermined threshold Fth is the number of wheel revolutions computed over a predetermined amount of time for each of the corresponding drive wheels. If the number of revolutions for the steering wheels differ from the number of revolutions for the corresponding drive wheels by a predetermined amount, then, again, a misalignment can be identified.

In yet another embodiment, the alignment function Fm is determined according to the following equation:

$$F_m = \left[\frac{(LE-E)+(RE-E)}{2}\right] * \left(e^{\frac{-D}{T}}\right) / T$$

here LE=total number of pulses generated by left steering wheel during a predetermined sample period; RE=total number of pulses generated by right steering wheel during the predetermined sample period; E=an expected value for number of pulses for the left and right steering wheels based on the speed of the vehicle as sensed by a sensor (not shown) coupled to the output shaft of the vehicle's transmission, or based on GPS, for example; D=total number of differences between the left and right steering wheels during the sample period (i.e., a counter that incremented every sample period if the absolute value of (LE-RE) is not equal to zero); and T=total time of the sample period. The exponential term is used as a filter to remove fluctuations due to the swerving of the vehicle, c.g., when the vehicle passes other vehicles or changes lanes. However, this term may be eliminated to accommodate computational limitations and still obtain similar results.

Ideally, Fm would be computed as "0" such that there is no wheel misalignment. However, there is always a certain amount of wheel misalignment inherent in every axle. The goal is to maintain the "misalignment" within an acceptable range to minimize tire wear, i.e. the goal is to minimize Fm. When the wheels 16 are in the acceptable range, a baseline Fm is established, which is effectively equated to zero (0) misalignment. As the vehicle travels over bumps and encounters other rough road conditions, the axle components slowly bring the wheels 16 out of the acceptable range. The $Fm_{av}$ values that are continually calculated eventually increase in value as the wheels become misaligned. Eventually, $Fm_{av}$ will be greater than the predetermined threshold Fth. Thus, the CPU 24 will detect misalignment and will send a signal to the motor 28 to move the adjustment bar 26.

First, the CPU will determine whether the last adjustment made was a toe-out adjustment, as shown at block 48 in FIG.

3. If no previous adjustment was made or if the last adjustment was a toe-in adjustment then the computer will determine whether the previous $Fm_{av}$ was lower than the new $Fm_{av}$, shown in block 50. If the previous $Fm_{av}$ was greater than the new $Fm_{av}$ or if there was no previous $Fm_{av}$ then the CPU 24 sends a signal to adjust as toe-in, see block 52. Thus, if no previous adjustment has occurred, the first adjustment will be a toe-in adjustment. Or, if a previous toe-in adjustment was made and the value of $Fm_{av}$ is improving, i.e. moving closer to the predetermined threshold Fth, then further toe-in adjustment will be made until $Fm_{av}$ is equal or less than the predetermined threshold Fth. If the previous adjustment was toe-in and $Fm_{av}$ is worsening, i.e. the previous $Fm_{av}$ was lower than the new $Fm_{av}$ then a further toe-in adjustment will not be made and instead a correcting toe-out adjustment will be made, see block 54.

If the last adjustment was a toe-out adjustment then the computer will determine whether the previous $Fm_{av}$ was lower than the new $Fm_{av}$, shown in block 56. If the previous $Fm_{av}$ was lower than the new $Fm_{av}$, i.e., $Fm_{av}$ is worsening then no further toe-out adjustment will occur, and the CPU 24 will send a signal to adjust as toe-in, see block 52. If $Fm_{av}$ is improving, i.e., the previous $Fm_{av}$ was not lower than the new $Fm_{av}$, but still greater than the predetermined threshold, a further toe-out adjustment will be made.

Any predetermined adjustment value can be used as an adjustment increment for the adjustment bar 26. Preferably, the adjustment will be in one-sixteenth inch (1/16 in.) increments. If a correcting adjustment must be made, i.e. a toe-in adjustment was made that resulted in a worse $Fm_{av}$, then the correcting adjustment would be one-eighth of an inch (1/8 in.=1/16 in.+1/16 in.).

Rather than being fixed, the threshold may be variable. That is, the alignment function $F_m$ may be compared with its previous value in order to minimize the $F_m$. Here, alignment adjustments are performed until the minimum $F_m$ value is obtained. This allows the CPU 24 to optimize the alignment to the particular road characteristics, vehicle load, and vehicle speed. Thus, dynamic alignment is performed for the current vehicle conditions.

Upon detecting the misalignment utilizing any of the above-described embodiments, the angle of the steering wheels can be controlled accordingly to reduce, and eventually eliminate, the misalignment. In doing so, the toe-in/toe-out position of the steering wheels 16 is adjusted when the controller 24 generates a command for receipt by motor 28, which, in turn, rotates the adjustment bar 26.

If the controller 24 determines the steering wheels are being adjusted in the wrong direction based on a worsening value of $Fm_{av}$, then the angle of the steeling wheels is adjusted in the opposite direction from the previous adjustment. This form of adjustment may be carried out automatically utilizing a neural network or a fuzzy algorithm controller.

Thus, if an upward trend for $F_m$ is detected (i.e., $F_m$ exceeds predetermined threshold), then the toe (e.g., toe-in) is adjusted by a predetermined amount. If the newly determined $F_m$ also exceeds the predetermined threshold and is still increasing, then the steering wheels are adjusted for toe-out by the predetermined amount. If, however, the $F_m$ is decreasing, yet still exceeding the predetermined threshold, the steering wheels are adjusted for toe-in again by either the same amount or by an increased amount.

Preferred embodiments have been disclosed. However, a worker skilled in this art would recognize that modifications would come within the scope ol this invention. Thus, the following claims should be studied to determine the scope and content of this invention.

What is claimed is:

1. A method for detecting misalignment of wheels of a vehicle while the vehicle is traveling on a road, the vehicle having steering wheels mounted to a steering axle and drive wheels mounted to a drive axle, the method comprising:

sensing a number of revolutions for each of the steering wheels;

determining an alignment function based on the number of revolutions;

comparing the alignment function to an alignment threshold; and detecting misalignment of the steering wheels if the alignment function differs from the alignment threshold.

2. The method as recited in claim 1 wherein determining the alignment function includes determining a number of revolutions for each of the steering wheels over a predetermined distance and wherein the alignment threshold corresponds to an empirically derived number of wheel revolutions associated with non-misalignment for the predetermined distance.

3. The method as recited in claim 1 further comprising: sensing a number of revolutions for each of the drive wheels wherein determining the alignment function includes determining a number of revolutions for each of the steering wheels over a predetermined amount of time and wherein the alignment threshold corresponds to the number of revolutions determined over the predetermined amount of time for each of the corresponding drive wheels.

4. The method as recited in claim 1 wherein determining the alignment function comprises:

sensing a speed of the vehicle;

determining a difference between the speed of the vehicle and the number of wheel revolutions for each of the steering wheels; and determining the alignment function based on the difference.

5. The method as recited in claim 4 wherein determining the alignment function further includes filtering data in which there is a difference in the number of wheel revolutions between each of the steering wheels.

6. The method as recited in claim 4 wherein the alignment threshold is a fixed predetermined value.

7. The method as recited in claim 4 wherein the alignment threshold is a variable threshold corresponding to a previous value of the alignment function.

8. The method as recited in claim 1 further comprising controlling an angle of the steering wheels to bring the steering wheels into alignment upon detecting misalignment.

9. The method as recited in claim 8 wherein controlling the angle further comprising:

adjusting the angle of one of the steering wheels in a first direction;

determining a subsequent alignment function;

if the subsequent alignment function differs from the alignment threshold, determining if the subsequent alignment function exceeds the previous alignment function;

if so, adjusting the angle of the one of the steering wheels in a second direction opposite of the first direction; and if not, further adjusting the angle of the one of the steering wheels in the first direction.

10. A system for detecting misalignment of wheels of a vehicle while the vehicle is traveling on a road, the vehicle having steering wheels mounted to a steering axle and drive wheels mounted to a drive axle, the system comprising:

a sensor for sensing a number of revolutions for each of the steering wheels; and a controller for determining an alignment function based on the number of revolutions, comparing the alignment function to an alignment threshold, and detecting misalignment of the steering wheels if the alignment function differs from the alignment threshold.

11. The system as recited in claim 10 wherein the controller, in determining the alignment function, is further operative to determine a number of revolutions for each of the steering wheels over a predetermined distance and wherein the alignment threshold corresponds to an empirically derived number of wheel revolutions associated with non-misalignment for the predetermined distance.

12. The system as recited in claim 10 further comprising a second sensor for sensing a number of wheel revolutions for each of the drive wheels and wherein the controller, in determining the alignment function, is further operative to determine a number of revolutions for each of the steering wheels over a predetermined amount of time and wherein the alignment threshold corresponds to a number of revolutions determined over the predetermined amount of time for each of the corresponding drive wheels.

13. The system as recited in claim 10 further comprising:

a speed sensor for sensing a speed of the vehicle; and wherein the controller, in determining the alignment function, is further operative to determine a difference between the speed of the vehicle and the number of wheel revolutions for each of the steering wheels, and determine the alignment function based on the difference.

14. The system as recited in claim 13 wherein the controller, in determining the alignment function, is further operative to filter data in which there is a difference in the number of wheel revolutions between each of the steering wheels.

15. The system as recited in claim 13 wherein the alignment threshold is a fixed predetermined value.

16. The system as recited in claim 13 wherein the alignment threshold is a variable threshold corresponding to a previous value of the alignment function.

17. The system as recited in claim 10 wherein the controller is further operative to control an angle of the steering wheels to bring the steering wheels into alignment upon detecting the misalignment.

18. The system as recited in claim 17 wherein the controller, in controlling the angle, is further operative to adjust the angle of one of the steering wheels in a first direction; determine a subsequent alignment function; if the subsequent alignment function differs from the alignment threshold, determine if the subsequent alignment function exceeds the previous alignment function; if so, adjust the angle of the one of the steering wheels in a second direction opposite of the first direction; and if not, further adjust the angle of the one of the steering wheels in the first direction.

19. A system for actively adjusting wheel misalignment during vehicle travel for a vehicle having at least one pair of wheels mounted to an axle, the system comprising:

a controller for generating a control signal when wheel misalignment is detected;

an adjustment bar extending between and operatively coupled to the wheels to move the wheels between any of various toe-in and toe-out positions; and an actuator connected to said adjustment bar for controlling the position of said bar based on said control signal.

20. A system as recited in claim 19 wherein said actuator is comprised of a linear motor coupled to said adjustment bar.

21. A system as recited in claim 20 wherein said motor rotates said adjustment bar in a first direction to move said wheels to a toe-in position and rotates said adjustment bar in a second direction, opposite from said first direction, to move said wheels to a toe-out position.

22. A method for actively adjusting wheel misalignment during vehicle travel for a vehicle having at least one pair of wheels mounted to an axle with an adjuster member extending between and being coupled to the wheels, the method comprising:

(a) detecting wheel misalignment during vehicle travel;

(b) generating a control signal;

(c) moving the adjuster member to place the wheels in a first adjusted position based on the control signal.

23. A method as recited in claim 22 including the steps of detecting increased wheel misalignment subsequent to step (c), generating a second control signal, and moving the adjuster member in an opposite direction to place the wheels in a second adjusted position based on the second control signal.

* * * * *